(12) United States Patent
Saito et al.

(10) Patent No.: US 7,610,434 B2
(45) Date of Patent: Oct. 27, 2009

(54) FILE RECORDING APPARATUS

(75) Inventors: Hiroshi Saito, Osaka (JP); Toshihiro Tanaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 377 days.

(21) Appl. No.: 10/578,270

(22) PCT Filed: Oct. 7, 2004

(86) PCT No.: PCT/JP2004/015182

§ 371 (c)(1),
(2), (4) Date: May 4, 2006

(87) PCT Pub. No.: WO2005/050453

PCT Pub. Date: Jun. 2, 2005

(65) Prior Publication Data

US 2007/0088666 A1 Apr. 19, 2007

(30) Foreign Application Priority Data

Nov. 18, 2003 (JP) .............................. 2003-387886

(51) Int. Cl.
*G06F 12/00* (2006.01)
*G06F 13/00* (2006.01)
*G06F 13/28* (2006.01)

(52) U.S. Cl. .................. 711/103; 711/112; 711/115

(58) Field of Classification Search .................. 711/103, 711/115, 112
See application file for complete search history.

(56) References Cited

U.S. PATENT DOCUMENTS

| 5,630,093 | A | 5/1997 | Holzhammer et al. |
| 5,745,418 | A | 4/1998 | Ma et al. |
| 5,933,846 | A | 8/1999 | Endo |
| 6,094,693 | A | * 7/2000 | Haneda ........................ 710/36 |
| 6,141,249 | A | * 10/2000 | Estakhri et al. ......... 365/185.11 |
| 6,571,312 | B1 | 5/2003 | Sugai et al. |
| 6,611,907 | B1 | 8/2003 | Maeda et al. |
| 6,691,205 | B2 | * 2/2004 | Zilberman .................. 711/103 |

(Continued)

FOREIGN PATENT DOCUMENTS

JP 08-147202 6/1996

(Continued)

OTHER PUBLICATIONS

Standard ECMA-107 $2^{nd}$ Edition, Jun. 1995.

(Continued)

*Primary Examiner*—Sanjiv Shah
*Assistant Examiner*—Yaima Campos
(74) *Attorney, Agent, or Firm*—Wenderoth, Lind & Ponack L.L.P.

(57) ABSTRACT

To effectively record files onto a semiconductor memory, a file recording apparatus has a plurality of file buffers provided for the respective files. Data requested to be written is accumulated in a corresponding file buffer. A judgment is made as to whether data having been accumulated reaches the size of one block, which is a unit of erasing the semiconductor memory. If it is judged that data accumulated in one of the file buffers or in the plurality of file buffers in total has reached the block size, the accumulated data is written into a free block of the semiconductor memory.

13 Claims, 12 Drawing Sheets

U.S. PATENT DOCUMENTS

| | | |
|---|---|---|
| 2002/0026566 A1* | 2/2002 | Awada et al. ............... 711/162 |
| 2002/0166022 A1 | 11/2002 | Suzuki |
| 2005/0080985 A1 | 4/2005 | Sasaki |

FOREIGN PATENT DOCUMENTS

| | | |
|---|---|---|
| JP | 2000-122811 | 4/2000 |
| JP | 2000-305862 | 11/2000 |
| JP | 2001-188701 | 7/2001 |
| JP | 2003-308240 | 10/2003 |

OTHER PUBLICATIONS

Supplementary European Search Report issued Feb. 19, 2009 in the corresponding European Patent Application No. 04792410.5.

* cited by examiner

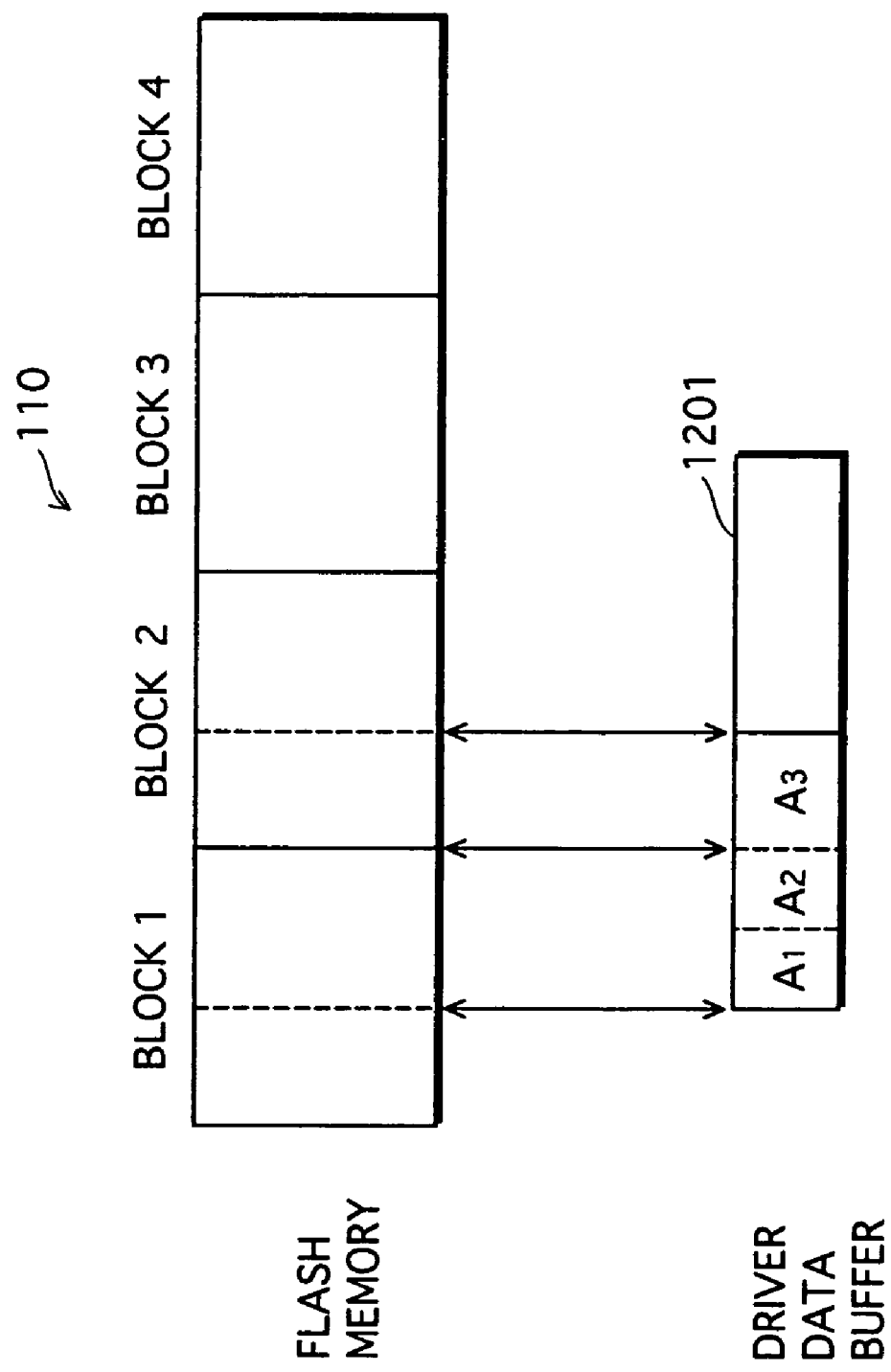

FILE RECORDING APPARATUS

TECHNICAL FIELD

The present invention relates to a file recording apparatus for recording a file in semiconductor memory.

BACKGROUND ART

Non-volatile semiconductor memory is a type of memory that retains the stored contents even when the power is switched off. Although erasing is required before recording new data, this type of semiconductor memory is highly resistant to vibration and quiet since it is not mechanically driven or rotated. In addition, a recent increase in recording density offers an increase in capacity of semiconductor memory. Because of these advantages, non-volatile semiconductor memory is becoming increasingly common as a suitable information recording medium along with CDs (Compact Discs), DVDs (Digital Versatile Discs), and the like.

Among various types of semiconductor memory, flash memory is a later form of EEPROM (Electrically Erasable Programmable Read Only Memory) which must be erased byte-wise. Since it is erasable in blocks all at once, flash memory is now widely used in form of commercially available products, such as SD memory cards, for storing images taken by a digital camera.

A file system is used to manage data on various types of recording mediums including flash memory. Some of the common file systems are: FAT (File Allocation Table, Standard ECMA-107: Volume and File Structure of Disk Cartridges for Information Interchange); NTFS (New Technology File System); and UDF (Universal Disk Format). Through the use of a file system, video and audio data organized as files are concurrently recorded or reproduced.

According to a FAT file system, memory allocation and file management are carried out in units called clusters.

It should be noted that at least one cluster is occupied by a file no matter how small the file data may be. Thus, the lager the cluster size is, the lower the capacity efficiency of the memory becomes. On the other hand, the larger the block size is, the higher the memory density becomes. In view of the above, the block size is normally larger than the cluster size.

In addition, in the case where one cluster extends over two blocks, both the blocks need to be erased before recording data into the cluster. One technique for avoiding such an occurrence is disclosed in JP patent application publication No. 2001-188701. According to the disclosure, the file system is allowed to simply erase a block of flash memory if clusters belonging to that block are all free, and then to perform a data write.

Unfortunately, however, if the block includes any cluster storing data of an existing file, a series of operations (correctively called a Read-Modify-Write operation, hereinafter "RMW operation") needs to be performed. The RMW operation is composed of: reading, before erasing a block, data stored in the block to a temporary memory on the main storage; deleting contents of the block; modifying the data on the temporary memory to reflect changes made to the file; and writing back contents of the temporary memory. That is, the RMW operation involves extra operations of the reading and modifying.

In addition, the series of operations is required each time data is written to the same block. Suppose a large volume of consecutive data such as video and audio data is to be written. In such a case, the series of operations needs to be repeated on the same blocks and thus the same set of data is read out and written back over and over, which requires a long processing time.

DISCLOSURE OF THE INVENTION

The present invention is made in view of the above problems and has a first object of providing a file recording apparatus for recording data effectively and without waste, onto a recording medium of a type that needs to be erased in a batch. The present invention has a second object of providing a program executable under a conventional file system, for recording data onto a recording medium of the above-mentioned type effectively and without waste.

The objects stated above is achieved by a file recording apparatus for recording data onto a recording medium which is written in clusters and erased in blocks each composed of a predetermined number of contiguous clusters. The file recording apparatus includes: a receiving unit operable to receive a request for writing data of a specific one of a plurality of files onto the recording medium; a plurality of file buffers each for a different one of the files; a data accumulating unit operable to accumulate the data requested to be written, in one of the file buffers corresponding to the specific file; a judging unit operable to judge whether data having been accumulated by the data accumulating unit is no smaller than a block size; and a writing unit operable, if the judging unit judges affirmatively, to extract a block of data from the accumulated data and to write the extracted data into a free block of the recording medium.

With the structure stated above, when one or more requests are made to write file data onto a recording medium which requires block-wise erasing before a data write, a data write is performed only once per block. This is effective and without waste in comparison to the case where a data write is performed each time a data request is made. In such a case, before a requested data write is performed on a block, it is required to read and re-write data currently stored on the block.

Here, the judging unit may judge affirmatively if data having been accumulated in a specific one of the file buffers to which the data accumulating unit most recently accumulated data is no smaller than the block size. The writing unit may extract a block of data from a top of the specific file buffer, and write the extracted data to the free block of the recording medium.

With the structure stated above, a data write is performed in units of blocks each composed of data of a single file.

Here, the judging unit may judge affirmatively when a total of quotients each calculated by dividing a size of data accumulated in a respective one of the file buffers by a cluster size is no smaller than the predetermined number. The writing unit may extract data from the respective file buffers cluster by cluster until the predetermined number of clusters is reached, and write the extracted data to the free block of the recording medium.

With the structure stated above, a data write is performed in units of blocks each composed of data of a plurality of files in proportion to the amounts of data requested to be written to the respective files.

Here, the file recording apparatus may further include: an erasing unit operable to erase the free block before the writing unit writes the extracted data to the free block.

With the structure stated above, a block is erased before a data write to the block is performed.

In another aspect, the objects stated above are achieved by a control method for a file recording apparatus that includes a plurality of file buffers each for a different one of a plurality of files and that records data onto a recording medium. The recording medium is written in clusters and erased in blocks each composed of a predetermined number of contiguous clusters. The method includes: a receiving step of receiving a request for writing data of a specific one of a plurality of files onto the recording medium; a data accumulating step of accumulating the data requested to be written, in one of the file buffers corresponding to the specific file; a judging step of judging whether data having been accumulated in the data accumulating step is no smaller than a block size; and a writing step of writing, if the judging step results in the affirmative, to extract a block of data from the accumulated data and to write the extracted data into a free block of the recording medium.

With the method stated above, when one or more requests are made to write file data onto a recording medium which requires block-wise erasing before a data write, a data write is performed only once per block. This is effective and without waste in comparison to the case where a data write is performed each time a data request is made. In such a case, before a requested data write is performed on a block, it is required to read and re-write data currently stored on the block.

In yet another aspect, the objects stated above are achieved by a program for execution by a file recording apparatus that includes a plurality of file buffers each for a different one of a plurality of files and that records data onto a recording medium. The recording medium is written in clusters and erased in blocks each composed of a predetermined number of contiguous clusters. The program includes code operable to cause the file recording apparatus to perform: a receiving step of receiving a request for writing data of a specific one of a plurality of files onto the recording medium; a data accumulating step of accumulating the data requested to be written, in one of the file buffers corresponding to the specific file; a judging step of judging whether data having been accumulated in the data accumulating step is no smaller than a block size; and a writing step of writing, if the judging step results in the affirmative, to extract a block of data from the accumulated data and to write the extracted data into a free block of the recording medium.

By applying the above program to a file recording apparatus, when one or more requests are made to write file data onto a recording medium which requires block-wise erasing before a data write, a data write is performed only once per block. This is effective and without waste in comparison to the case where a data write is performed each time a data request is made. In such a case, before a requested data write is performed on a block, it is required to read and re-write data currently stored on the block.

In yet another aspect, the objects stated above are achieved by a program for execution by a file recording apparatus that includes a driver data buffer and that records data onto a recording medium. The recording medium is written in clusters and erased in blocks each composed of a predetermined number of contiguous clusters. The program includes code operable to cause the file recording apparatus to: a receiving step of receiving a write request that specifies a write address on the recording medium at which data is requested to be written; a first judging step of judging, if the driver data buffer is not empty, whether the write address specified for the data requested to be written is contiguous to a write address specified for data stored on the driver data buffer; a data accumulating step of accumulating, if the first judging step results in the affirmative, in the driver data buffer the data requested to be written; a second judging step of judging whether a write address specified for data accumulated in the driver data buffer falls on a block boundary of the recording medium; and a write step of writing, if the second judging step results in the affirmative, a part of the accumulated data from a top of the driver data buffer up to a point corresponding to the block boundary, onto the recording medium.

By applying the above program to a file recording apparatus, when one or more requests are made to write file data at a specified address on a recording medium which requires block-wise erasing before a data write, a data write is performed only once per block. This is effective and without waste in comparison to the case where a data write is performed each time a data request is made. In such a case, before a requested data write is performed on a block, it is required to read and rewrite data preciously stored in the block.

Here, the program stated above may be a filter driver of the recording medium.

With the structure stated above, addition of the filter driver to an existing file system ensures effective file recording.

BRIEF DESCRIPTION OF THE DRAWINGS

FIG. 12 shows a correspondence between data on a driver data buffer 1201 and blocks of the flash memory, according to the third embodiment.

BEST MODE FOR CARRYING OUT THE INVENTION

Hereinafter, a description is given to embodiments of a file recording apparatus according to the present invention, with reference to the accompanying drawings.

First Embodiment

In a first embodiment, the file system ensures effective recording of files.

Figure 1:
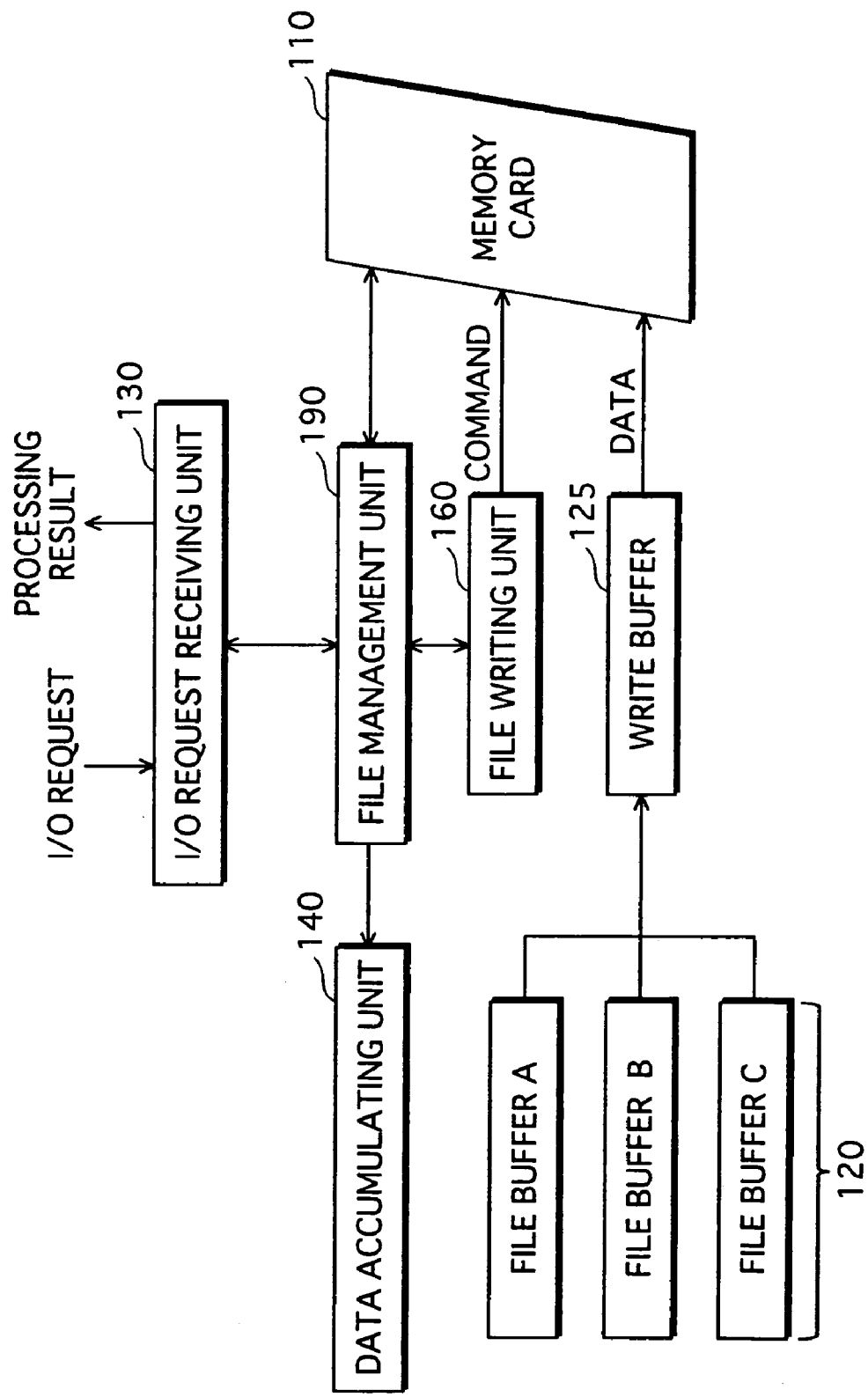
FIG. 1 is a view showing a structure of a file recording apparatus according to a first embodiment of the present invention.

FIG. 1 shows a structure of a file recording apparatus according to the first embodiment.

The file recording apparatus is composed of a memory card 110, file buffers 120, a write buffer 125, an I/O (input and output) request receiving unit 130, a data accumulating unit 140, a file writing unit 160, and a file management unit 190.

The file recording apparatus is additionally provided with a CPU and memory, which are not shown in the figures. Each component units mentioned above is comprised of a program or memory area. Programs comprising component units are loaded to the memory and executed by the CPU.

The file recording apparatus receives an I/O request for one or more files. Sources of an I/O request are, for example, an application running on the file recording apparatus and a device connected via a network. Such I/O request sources may concurrently request the file recording apparatus to record data on multiple files.

Furthermore, there may be a plurality of different types of I/O request sources, such as an application and a device on the network. Alternatively, there may be a plurality of I/O request sources of the same type, such as applications A, B, and C. Yet, for the simplicity sake, the description hereinafter is given assuming that there is a single I/O request source.

Next, a description is given to each component unit of the file recording apparatus.

The memory card 110 records a file at a request from the I/O request source.

Figure 2:
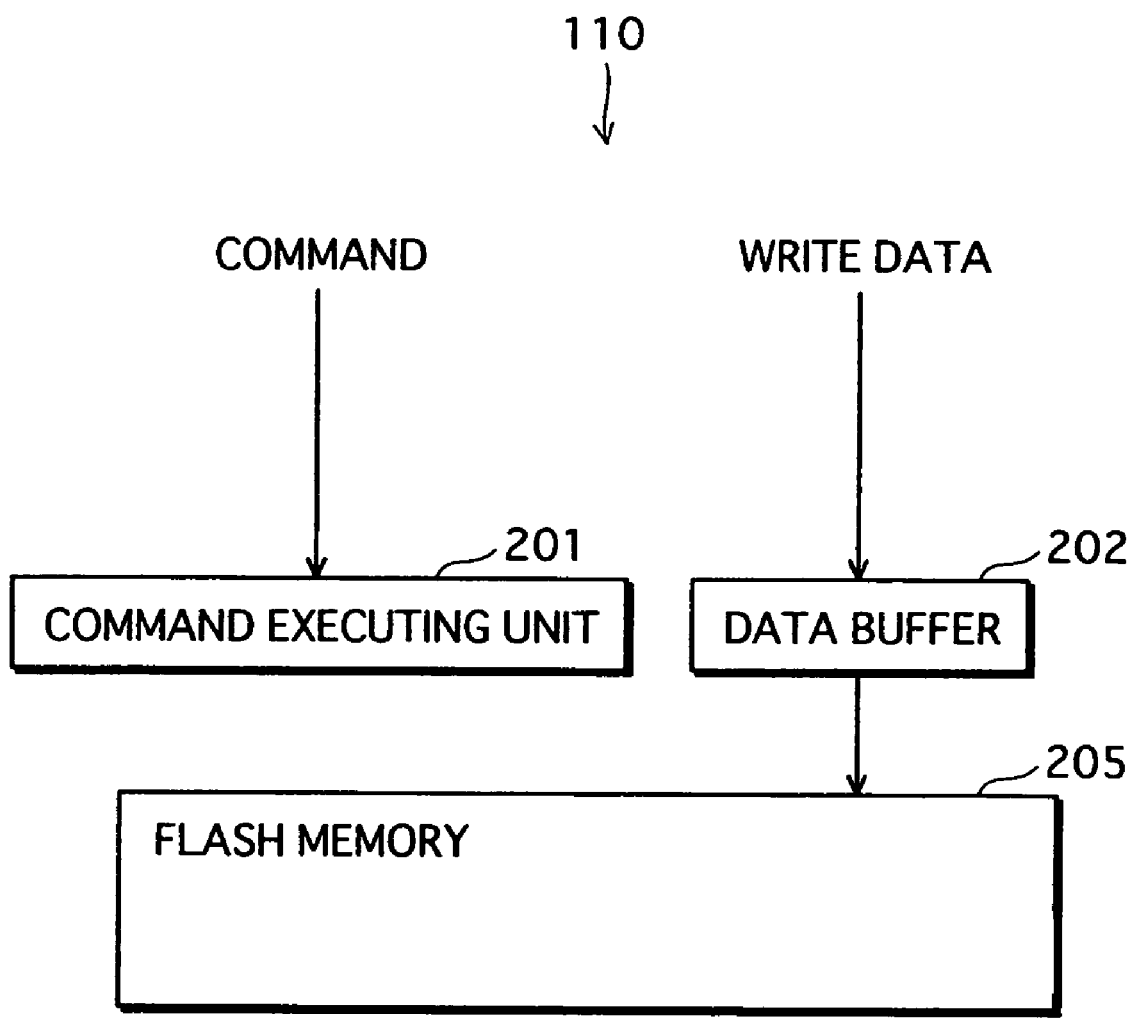
FIG. 2 shows a structure of a memory card.

FIG. 2 shows a structure of the memory card 110. As shown in the figure, the memory card 110 is composed of a command executing unit 201, a data buffer 202, and a flash memory 205.

The command executing unit 201 receives a command executable on the memory card 110 from the file writing unit 160, and executes the received command. Commands executable by the command executing unit 201 are write commands, read commands, and block erase commands to be executed on the flash memory 205.

A write command contains information specifying a sector number and the number of sectors. The former is used as the start address for a data write on the flash memory 205, and the latter is used as the size of data to be written. On receiving a write command, the command executing unit 201 writes data held in the data buffer 202, of a size equivalent to the specified number of sectors to the flash memory 205 starting from the sector having the specified sector number. The maximum number of sectors that may be specified as a data size in a single write command is 128, which is equivalent to the block size.

The data buffer 202 has a size equivalent to the block size and temporarily holds data to be written in response to a write command. More specifically, the data buffer 202 temporarily holds data transferred from the file writing unit 160. Upon receipt of a write command, the command executing unit 201 writes the data held in the data buffer 202 to the flash memory 205. Also, the data buffer 202 temporarily holds data read from the flash memory 205 in response to a read command.

A read command contains information specifying a sector number and the number of sectors. The former is used as the start address for a data read on the flash memory 205, and the latter is used as the size of data to be read. Similarly to a write command, the maximum number of sectors that may be specified in a single read command is 128.

As mentioned above, the flash memory 205 requires block-wise erasing before performing a data write. More specifically, it is required to erase every block that includes a sector (which will be described later) or a cluster (which will be described later) onto which the data write will be performed. The flash memory 205 stores file data written by the command executing unit 201.

An erase command contains information indicating a block number of a block to be erased. On receiving an erase command, the command executing unit 201 erases the block of the flash memory 205 having the specified block number.

Figure 3:
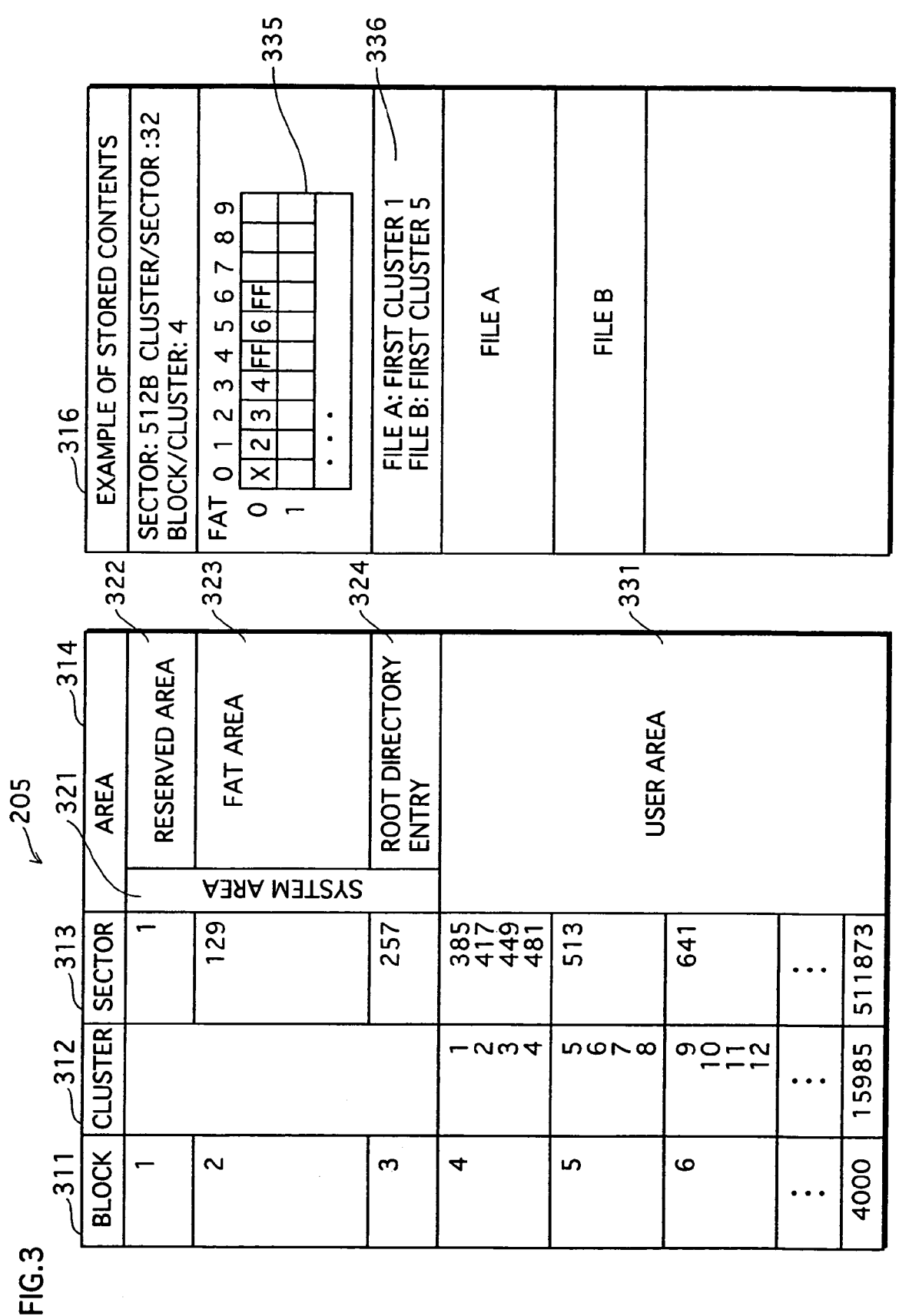
FIG. 3 shows an example format of a flash memory.

FIG. 3 shows an example format of the flash memory 205. In the figure, the flash memory 205 is divided into hierarchical partitions referred to as blocks 311, clusters 312, and sectors 313.

The blocks 311 are units of erasing that is normally performed before recording new data. At the time of writing file data, at least one free or non-used block is allocated to the file data. Note that there are blocks bearing the block number 4001 to 4192 that serve as backup. The blocks 4001-4192 are not shown in FIG. 3.

The clusters 312 are minimum units allocatable to file data. The clusters are referred to by an FAT 335, which will be described later.

The sectors 313 are minimum units of data input and output. The sectors 313 are serially assigned sector numbers which are integers starting from "1". The sector numbers serve as addresses on the flash memory. The data size to be written through a data write to the flash memory 205 is indicated using the number of sectors not the numbers of byte. The sectors 313 shown in FIG. 3 by their sector numbers are the first sectors in each block and cluster.

The flash memory 205 has a memory area 314 that is roughly divided into a system area 321 and a user area 331.

The system area 321 stores management information, and is further divided into a reserved area 322, an FAT area 323, and a root directory entry 324.

The reserved area 322 stores boot information and parameters regarding the flash memory 205, which is a recording medium. FIG. 3 shows an example 316 of contents stored in the flash memory 205. In the example 316, the parameters indicate that the sector size is 512 B (bytes), the number of sectors per cluster is 32, and the number of clusters per block is 4. Thus, the cluster size is 16 KB, the block size is 64 KB, and the storage capacity of the flash memory 205 is 256 MB. It should be noted, however, the cluster and block sizes are not limited to the specific values mentioned herein. With some types of flash memory, the block size may be 128 KB or 256 KB and the cluster size may be 8 KB or 32 KB.

The FAT area 323 stores the FAT 335. The FAT 335 is a table showing which clusters store file data.

The root directory entry 324 is a memory area for a directory containing file management information. For each file, the directory indicates the file name, the recording date and time (not illustrated), and the cluster number of the first one of the clusters allocated and occupied by the file (or the number of the first FAT entry).

For example, a directory 336 indicates that the first cluster occupied by the file A is the cluster 1. According to the FAT 335, the entry 1 that corresponds to the luster 1 contains the value "2", which indicates that the file A occupies the cluster 2 contiguous to the cluster 1. Similarly, the entries 2 and 3 hold the values "3" and "4", respectively. This means that the file A also occupies the clusters 3 and 4. The entry 4 holds the value "FF" which indicates the end of file. That is, the file A occupies the contiguous clusters 1-4, which together constitute the block 4. Note that the FAT area 323 stores the FAT 335 in duplicate for security reason (although not shown in duplicate in the figure).

The user area 331 is used to store file data and directory information. According to the first embodiment, memory allocation to file data is basically carried out in blocks. The format of the system area 321 is fixed, and the cluster numbers are assigned exclusively to clusters in the user area.

Referring back to FIG. 1, the file buffers 120 are buffers (memory areas) each having a size corresponding to two blocks and temporarily store data requested to be written by a write request issued from a an I/O request source. Each file buffer 120 is reserved by the file management unit 190 for a specific file created at a file open request from an I/O request source, and deallocated (returned) at a file close request. Note that the size of each file buffer 120 is not limited to the two-block size, and any size is applicable as long as it is larger by one block size than the later-described maximum data size requestable by a single I/O request.

The write buffer 125 is a block-sized memory area and used by the file writing unit 160 for temporarily storing file data to be written into the flash memory 205.

The I/O request receiving unit 130 receives, from an I/O request source, an I/O request for a file on the flash memory 205 of the memory card 110. There are several types of file I/O requests including requests for file open, file close, data write (Write), and date read (Read).

On receiving an I/O request which is a file open request, the I/O request receiving unit 130 further receives, from the I/O request source, the name of a file requested to be opened. Similarly, on receiving an I/O request which is a file close request, the I/O request further receives, from the I/O request source, the file descriptor (which will be described later) identifying a file requested to be closed.

On receiving an I/O request which is a data write request, the I/O request receiving unit 130 further receives, from the I/O request source, file data requested to be written (hereinafter, "write data"). The write data may be received subsequent to the data write request directly as it is or in form of the memory address and size (in bytes) of the data stored on a memory predetermined by the request source. The maximum data size may be requested per write request is equal to the blocksize (64KB). Note that the maximum data size is not limited to the block size and may be any other size, such as 256 KB.

In the case where the write data is received directly as it is, the I/O request receiving unit 130 transfers the received write data to the data area (not illustrated) of the memory.

On receiving an I/O request which is a data read request, the I/O request receiving unit 130 further receives, from the I/O request source, information relating to file data to be read. Yet, this function is not relevant to the file recording functions. Thus, no detailed description is given here.

The I/O request receiving unit 130 passes information about a received I/O request to the file management unit 190. The I/O request information contains: the type of the I/O request (whether it is a file open request, a data write request, and so on); and information about a file requested to be processed (a file descriptor in the case of a data write request or a file close request, or a file name in the case of a file open request) In the case of a data write request, the I/O request information further contains the address and size of write data. In return, the I/O request receiving unit 130 receives, from the file management unit 190, the result of processing performed according to the passed I/O request information, and supplies the processing result to the I/O request source. The processing result may be supplied directly as it is to the I/O request source. Alternatively, the processing result may be first transferred to a memory area and supplies the memory address to the I/O request source.

Under an instruction from the file management unit 190, the data accumulating unit 140 accumulates write data to one of the file buffers 120 corresponding to a file identified by the file descriptor. The write data is transferred by the file management unit 190 by passing the address and size of the memory area that stores the write data to the data accumulating unit 140.

Figure 4:
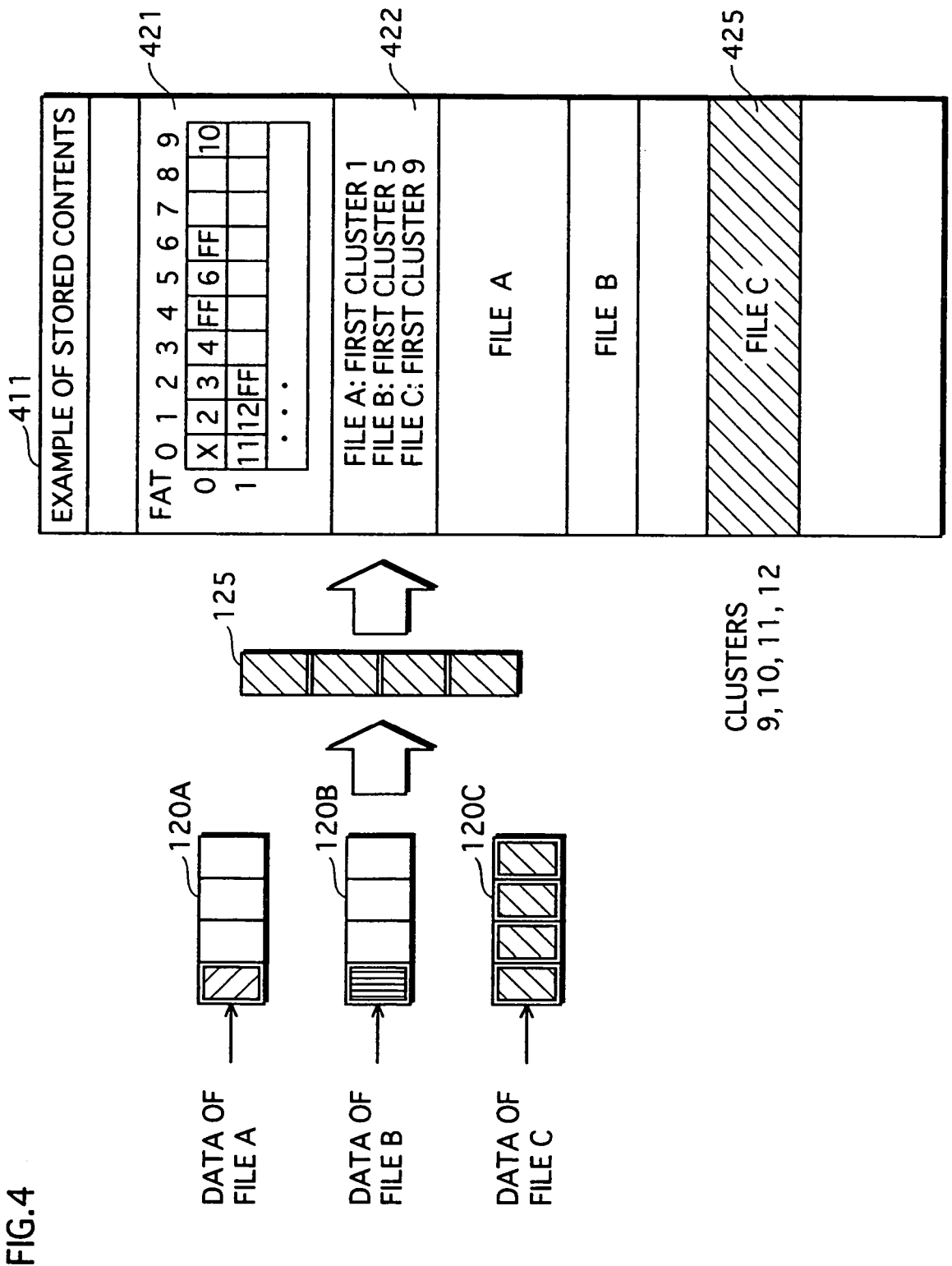
FIG. 4 shows an example of how data is accumulated in file buffers and written to the flash memory, according to the first embodiment.

FIG. 4 shows an example 411 of how data is accumulated in the file buffers 120A, 120B, and 120C and written to the flash memory 205. In the figure, write data is accumulated in a corresponding one of the file buffers 120A, 120B, and 120C each reserved for a specific file. For example, write data that belongs to a file C is accumulated in the file buffer 120C reserved for the file C. Here, the write data is "accumulated", which means that the write data is stored from the top of file buffer C if no other data is already stored. If the file buffer C already stores some data, the write data is written in the buffer 120C immediately subsequent to the stored data. For the sake of convenience in the description, the size of data stored in each file buffer 120 is illustrated in the figure as an integral multiple of the cluster size, although this is not always the case in practice. Furthermore, each file buffer 120 is illustrated in the figure as having the block size, although the size is equal to two blocks (eight clusters).

After accumulating write data to a corresponding one of the file buffers 120, the data accumulating unit 140 issues an end-of-accumulation notification to the file management unit 190.

Under an instruction form the file management unit 190, the file writing unit 160 extracts data equivalent to the block size from the top of a specified one of the file buffers 120. The file writing unit 160 then transfers the extracted data to the write buffer 125, and moves the data remaining in the file buffer 120 to the top. Finally, the file writing unit 160 instructs the memory card 110 to write the data stored in the write buffer 125 to a specified block (one block from the first block) of the flash memory 205. More specifically, a write instruction is issued by (i) transferring the write data stored in the write buffer 125 to the data buffer 202 of the memory card 110, and (ii) issuing to the command executing unit 201 a write command that contains the address of a block at which the write data is to be written and the size of the write data.

The file management unit 190 manages so that data writes to the flash memory 205 of the memory card 111 are performed in units of blocks.

The file management unit 190 receives I/O request information from the I/O request receiving unit 130. In the case where the received I/O request information indicates the type of I/O request is a data write request, the file management unit 190 passes the memory address and size of write data indicated by the I/O request information to the data accumulating unit 140. In addition, in accordance with a file descriptor contained in the I/O request information, the file management unit 190 instructs one of the file buffers 120 corresponding to a file specified by the file descriptor to accumulate the write data.

On receiving an end-of-accumulation notification from the data accumulating unit 140, the file management unit 190 checks the size of data accumulated on the corresponding one of the file buffers-120 and judges if the accumulated data is equal to the block size or larger.

If the judgment results in the affirmative, the file management unit 190 searches for free blocks with reference to the FAT 335, allocates the free blocks for the accumulated data, and erases the free blocks. The erasing is carried out by the file management unit 190 by issuing an erase command specifying the block numbers of the allocated blocks to the command executing unit 201 of the memory card 110. Note that a free block is a block of which clusters are all free (non-used).

Although free blocks are erased upon allocation of the blocks in this embodiment, the erasing of each block may be performed any time between deallocation of the block and a data write to the block. It is also applicable to set an erase flag for each block to indicate whether the block has been erased, and the erasing may be performed during the idle time of the memory card 110.

Next, the file management unit 190 instructs the file writing unit 160 to extract data equivalent to the block size from the top of the specified one of the file buffers 120 and write the thus extracted data to the flash memory 205. On receiving an end notification from the file writing unit 160, the file management unit 190 updates the file FAT 335 by renewing a portion relevant to the file into which data is written.

In FIG. 4, for example, the write buffer 125 stores one block of data of a new file C. When the file writing unit 160 writes the data stored in the write buffer 125 to a block (block 6 composed of clusters 9-12) of the flash memory 205, the file management unit 190 updates a directory 422 by newly recording the numeral "9", which is the number of the first cluster, for the file C. The file management unit 190 also updates an FAT 421 by recording successive cluster numbers 9-12 into the respective entries.

When there is no free block, the file management unit 190 performs error processing, through which log information indicating no data write is possible due to the exhaustion of free blocks is output to a non-illustrated log file. Alternatively, the log information may be displayed on a non-illustrated display unit.

According to this embodiment, no data write is possible when there is no free block. Yet, in one modification, it is applicable to search for and allocate free clusters if the total free clusters amounts to the block size. In this case, however, an RMW operation needs to be performed for each block containing such a cluster.

In addition, the file management unit 190 operates as follows when receiving an I/O request other than a write request from the I/O request receiving unit 130.

On receiving an I/O request which is a file open request, the file management unit 190 creates a new file in the flash memory 205 if there is no file having a file name contained in the I/O request information. If there already is a file having the file name, the file management unit 190 identifies the file and returns, as a processing result, a file descriptor to the I/O request source. As mentioned above, the file descriptor is information identifying the file. In future processing, the I/O request source uses the thus received file descriptor to specify the file. The creation of new file is composed of reserving a file buffer 120 and generating a directory for the new file.

On receiving an I/O request which is a file close request, the file management unit 190 performs processing to complete a data write of a file identified by a file descriptor contained in I/O request information. The completion processing is composed of writing any data residing on a corresponding one of the file buffers 120 to the flash memory 205, and deallocating (returning) the file buffer.

On receiving an I/O request which is a file read request, the file management unit 190 reads data from a file identified by a file descriptor contained in I/O request information, and sends the read data to the I/O request source.

The file management unit 190 is started at the time when the file recording apparatus starts operating, and reads the system area 321 (shown in FIG. 3) straddling the blocks 1-3 of the flash memory 205 into the memory. By reading the system area 321, the file management unit 190 acquires information about the blocks, clusters, and sectors. Further, in order to increase the process efficiency, the FAT and directory are updated first on the memory. The file management unit 190 then issues a write command to the memory card 110 as necessary, so that the new information is written to the blocks 2 and 3 of the flash memory 205 shown in FIG. 3, whereby the FAT and the directory are updated. It should be naturally appreciated that blocks of the system area also need to be erased before a data write.

Figure 5:
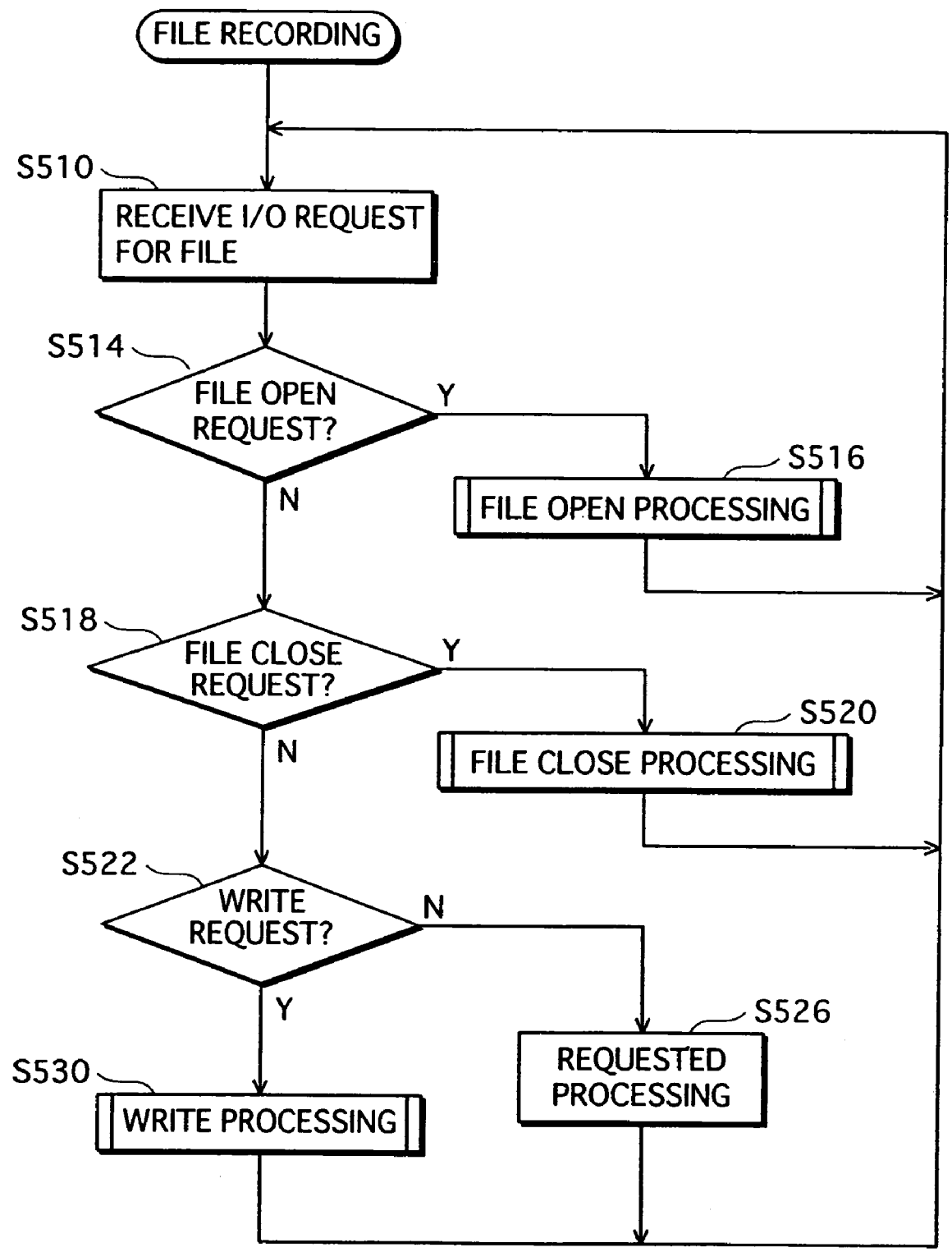
FIG. 5 shows a flowchart of processing steps of overall file recording processing according to the first embodiment.
Figure 6A:
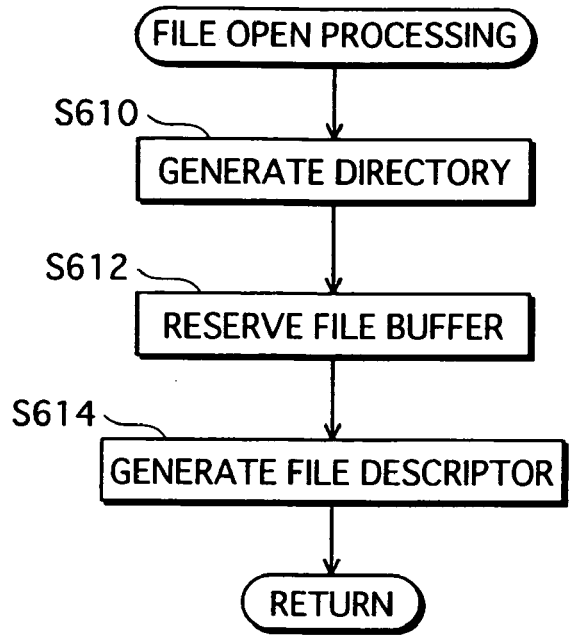
FIGS. 6A and 6B shows flowcharts of file open processing and file close processing according to the first embodiment.
Figure 6B:
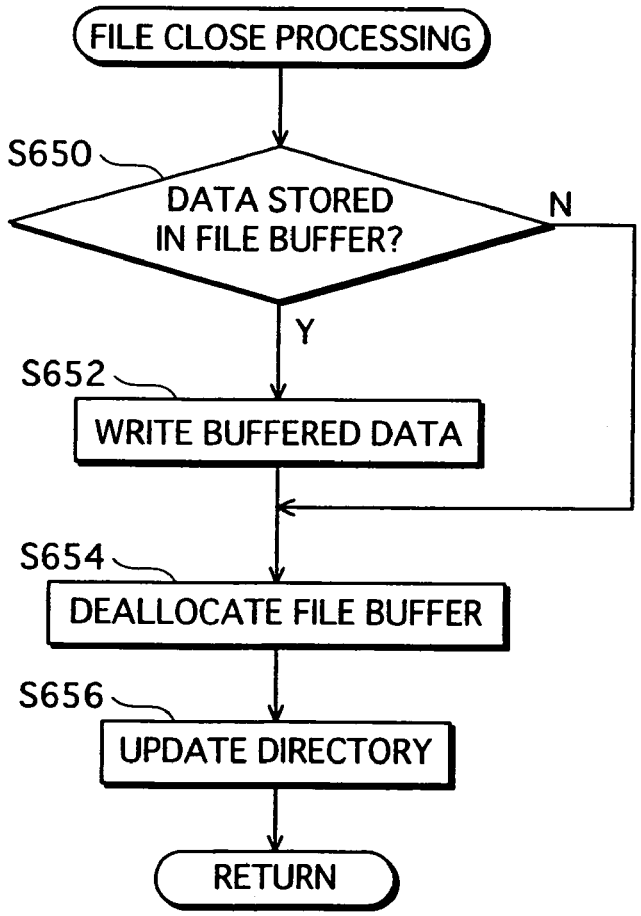
Figure 7:
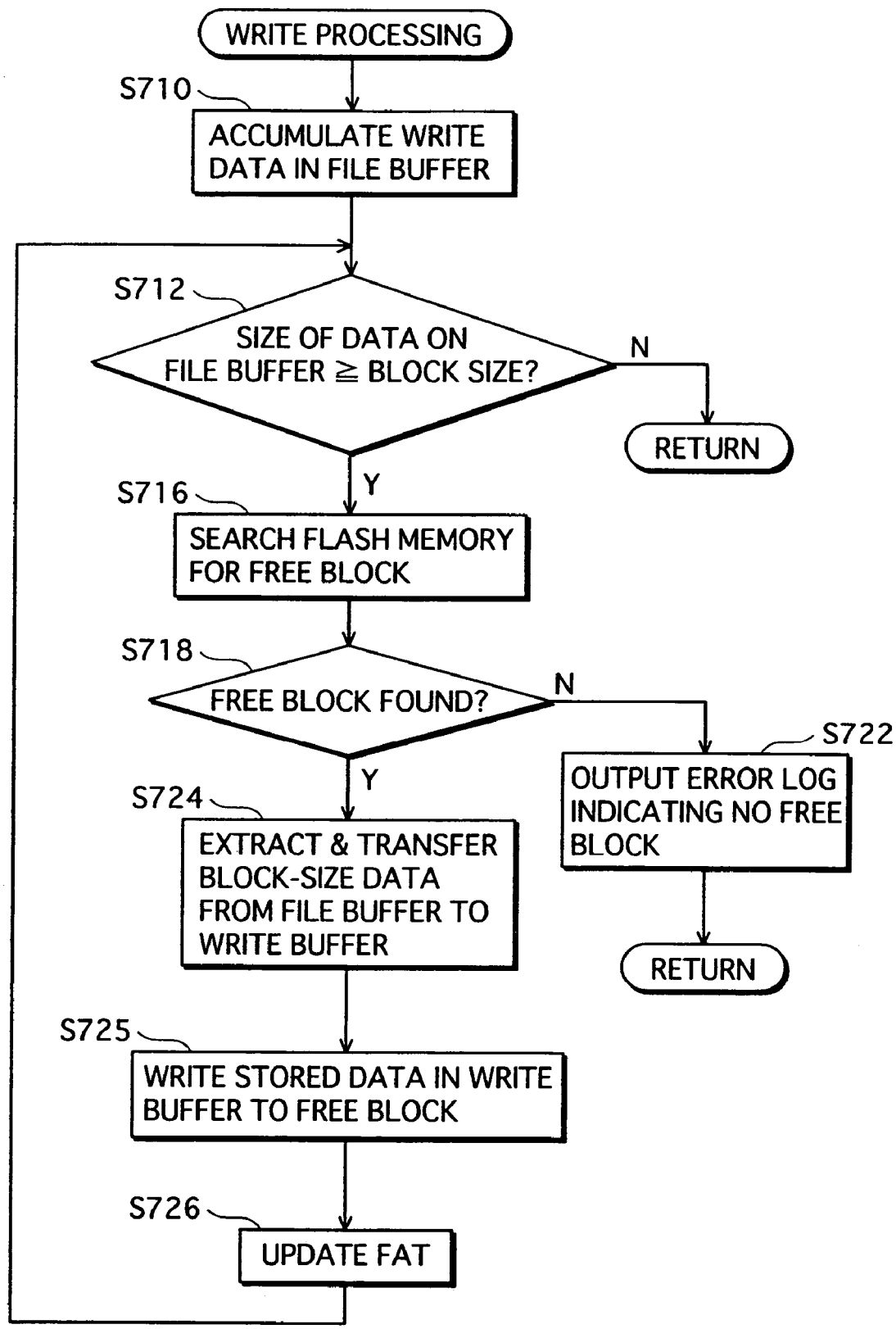
FIG. 7 shows a flow chart of data write processing performed in response to a data write request, according to the first embodiment.

FIGS. 5-7 are flowcharts of processing steps of file recording processing. A description is given to the file recording processing with reference to FIGS. 5-7.

In FIG. 5, the I/O request receiving unit 130 receives a file I/O request from an I/O request source (S510).

If the file I/O request is a request for opening a new file (S514), the file I/O request receiving unit 130 also receives the name of file to be opened. The I/O request receiving unit 130 then passes, to the file management unit 190, I/O request information composed of the file open request and the file name. In response, the file management unit 190 performs file open processing to create a new file with the requested file name (S516). The details of the file open processing will be given later.

If the file I/O request is a request for closing a file (S518), the I/O request receiving unit 130 also receives from the I/O request source a file descriptor identifying the file to be closed. The I/O request receiving unit 130 then passes, to the file management unit 190, I/O request information composed of the file close request and the file descriptor. In response, the file management unit 190 performs file close processing on the file identified by the file descriptor (S520). Details of the file close processing will be given later.

If the file I/O request is a write request (S522), the I/O request receiving unit 130 receives, subsequently to the write request, write data directly as it is. Alternatively, the I/O request receiving unit 130 may receive the address and data size (in bytes) of write data stored on a memory determined in advance by the I/O request source. On directly receiving the write data itself, the I/O request receiving unit 130 transfers the received write data to a data area (not illustrated) of the memory, generates I/O request information composed of the address and data size of the newly stored data, and passes the thus generated I/O request information to the file management unit 190. Upon receipt of a write request, write processing is performed. A description of write processing which is performed in response to a write request will be given later.

If the I/O request information is none of the above-mentioned requests, the I/O request receiving unit 130 performs processing according to the received I/O request (S526). One example of such a request is a request for reading file data from the flash memory 205. Yet, a detailed description thereof is omitted.

FIG. 6A shows a flowchart of the file open processing and FIG. 6B shows a flowchart of the file close processing.

In the file open processing, on receiving the I/O request information from the I/O request receiving unit 130, the file management unit 190 generates, in the root directory entry 324 shown in FIG. 3, a directory of the file having the file name indicated by the I/O request information (S610). For example, the directory 422 of the "File C" shown in FIG. 4 is created in the root directory entry 324. Note if the directory of the file already exists, the file is not new so that there is no need to create a new directory.

Next, the file management unit 190 reserves a file buffer 120 for the newly opened file (step S612). In the example shown in FIG. 4, the newly opened file is the "File C" and thus the file buffer 120C is reserved. The file management unit 190 then creates a file descriptor which serves as a pointer to the file, and passes, as a processing result, the file descriptor to the I/O request receiving unit 130. The I/O request receiving unit 130 returns, as the processing result of the file open request, the file descriptor received from the I/O request receiving unit 130 to the I/O request source.

In the file close processing, on receiving the I/O request information from the I/O request receiving unit 130, the file management unit 190 deallocates a file buffer 120, for example the file buffer 120C, corresponding to the file identified by the file descriptor contained in the I/O request information (step S611). Finally, the file management unit 190 records a recording date and time (not illustrated) into the directory of the file, for example in the directory 422, and returns a normal end notification as a processing result of the file close request, to the I/O request source via the I/O request receiving unit 130.

FIG. 7 is a flowchart of the data write processing performed in response to a data write request.

When it is judged that the file I/O request is a data write request, the file management unit 190 informs the data accumulating unit 140 about a file buffer 120 corresponding to the file identified by the file descriptor contained in the I/O request information, as well as the address and size of write data. The file management unit 190 then instructs the data accumulating unit 140 to load the write data stored at the informed address to the informed one of the file buffers 120 (S710). According to the instruction received from file management unit 190, the data accumulating unit 140 operates to store the data stored at the informed address to the informed one of the file buffers 120.

On receiving an end-of-accumulation notification from the data accumulating unit 140, the file management unit 190 checks the total size of the data stored on a corresponding one of the file buffers 120 to which the data has been accumulated, and judges whether the total size is not smaller than the block size (S712).

If the judgment results in the affirmative, the file management unit 190 searches for a free block with reference to the FAT 335 (S716). If there is a free block (S718), the file management unit 190 allocates the free block and cause the memory card 110 to erase the free block.

The file management unit 190 then instructs the file writing unit 160 to write the data residing on the file buffer 120 to the allocated free block. According to the instruction, the file writing unit 160 extracts data equivalent to the block size from the top of the file buffer 120, and transfers the extracted data to the write buffer 125 (S724). The data remaining on the file buffer 120 is moved forward. The file writing unit 160 then transfers the data on the write buffer 125 to the data buffer 202 of the memory card 110 and issues to the command executing unit 201 a write command specifying the start address of the allocated free block and the block size. As a result, the memory card 110 writes the data held on the write buffer 125 in the specified block of the flash memory 205 (S725). On receiving a recording-end-notification from the memory card 110, the file writing unit 160 accordingly issues a recording-end-notification to the file management unit 190.

On receiving the recording-end-notification from the file writing unit 160, the file management unit 190 updates the FAT by renewing a portion relevant to the file to which the data write has been performed (S726). The processing then branches to the step S712 to repeat the same operation on the data remaining on the specified file buffer 120.

According to one modification of the present embodiment, write data maybe accumulated in another way. For example, there may be an option of performing a data write immediately upon a data write request. In this case, the write data is not accumulated but immediately written to the flash memory 205. Alternatively, upon receipt of a data write request, a timer maybe set for a corresponding file buffer. If the stored content of the file buffer remains unchanged after a predetermined time period, the accumulated data is then written to the flash memory. Furthermore, in the case of receiving a data write request for replacing existing data with specified data, it is applicable to write all data held in a file buffer corresponding to a requested file prior to the data write operation.

Second Embodiment

In a second embodiment, a data write to the flash memory is performed in units of blocks and the block size data to be written may be composed of data of a plurality of files.

A file recording apparatus according to the second embodiment is basically similar in structure to the file recording apparatus according to the first embodiment shown in FIG. 1, except two component units unique to the second embodiment. More specifically, the file management unit 190 and the file writing unit 160 have different functions from their counterparts. Hereinafter, a description is given to the differences.

Figure 8:
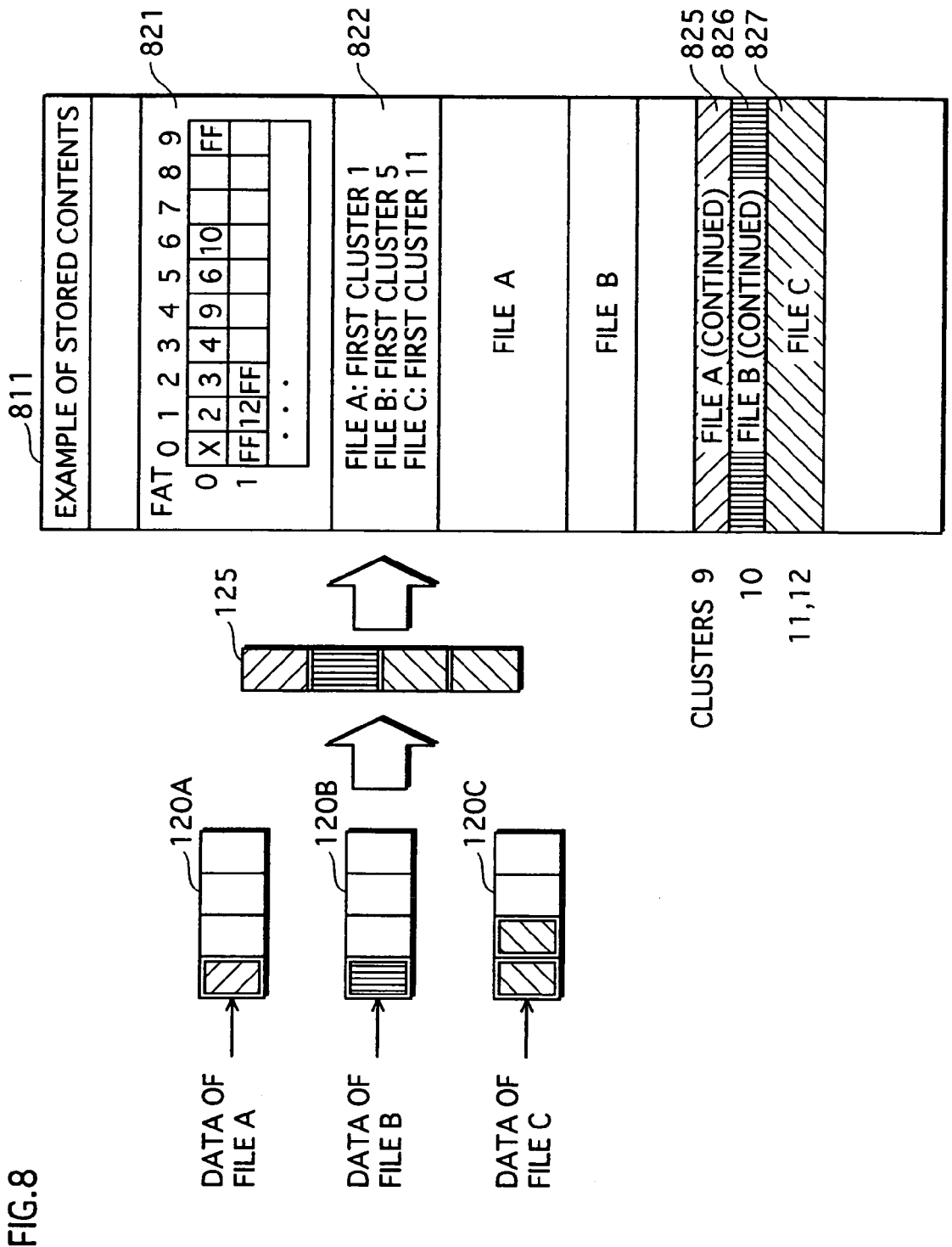
FIG. 8 shows an example of how data is accumulated in file buffers and written to the flash memory, according to a second embodiment of the present invention.

FIG. 8 shows an example of how data is accumulated in the respective file buffers 120A, 120B, and 120C, and written to the flash memory. According to the first embodiment (FIG. 4), data accumulated in each file buffer 120 is written to the flash memory 205 at the time when data is newly accumulated in one of the file buffers 120 and the size of data accumulated in that file buffer 120 reaches the block size. According to the second embodiment, a data write to the flash memory is performed even if data is newly accumulated to one of the file buffers 120 by the data accumulating unit 140 and the size of data accumulated in that file buffer 120 is smaller than the block size. More specifically, a data write to the flash memory is performed if the total size of data stored in all the file buffers 120 has reached the size of four clusters (i.e. the size of one block). In this case, the file management unit 190 extracts data from the respective file buffers 120 cluster by cluster until the extracted data amounts to the block size. The file management unit 190 then transfers the extracted data to the write buffer 125, and the transferred data is written to the flash memory. In the example shown in FIG. 8, a data write is performed to the flash memory 205 of which stored contents before the data write are as the example 3.16 shown in FIG. 3. The write data written through the data write operation is composed of one cluster extracted from the file buffer 120A, one from the file buffer 120B, and two from the file buffer 120C. As shown in an example 811 of the contents of the flash memory after the data write, the write data is stored in a free block (block number 6) composed of clusters numbered 9-12. Even in this case, data 825 of the file A is written to the cluster 9, data 826 of the file B is written to the cluster 10, and data 827 of the file C is written to the clusters 11 and 12. That is, each cluster contains data of a single file and thus no cluster contains data of different files mixed therein.

Regarding the files of which data is newly written, an FAT 821 and a directory 822 are updated.

Note that the size of data stored in the file buffers 120 is converted into clusters by calculating the maximum number of clusters which do not exceed the size of data stored in each file buffer 120.

Through the above processing steps, a data write is performed earlier on the whole than the case where a data write is performed when the size of data stored in a single file buffer reaches the block size. For example, in the case where video and audio data derived from one and the same content are differ in the amounts and yet the video and audio data need to be written in synchronism, the video and audio data is written to each block in proportion to the respective amounts of data.

Figure 9:
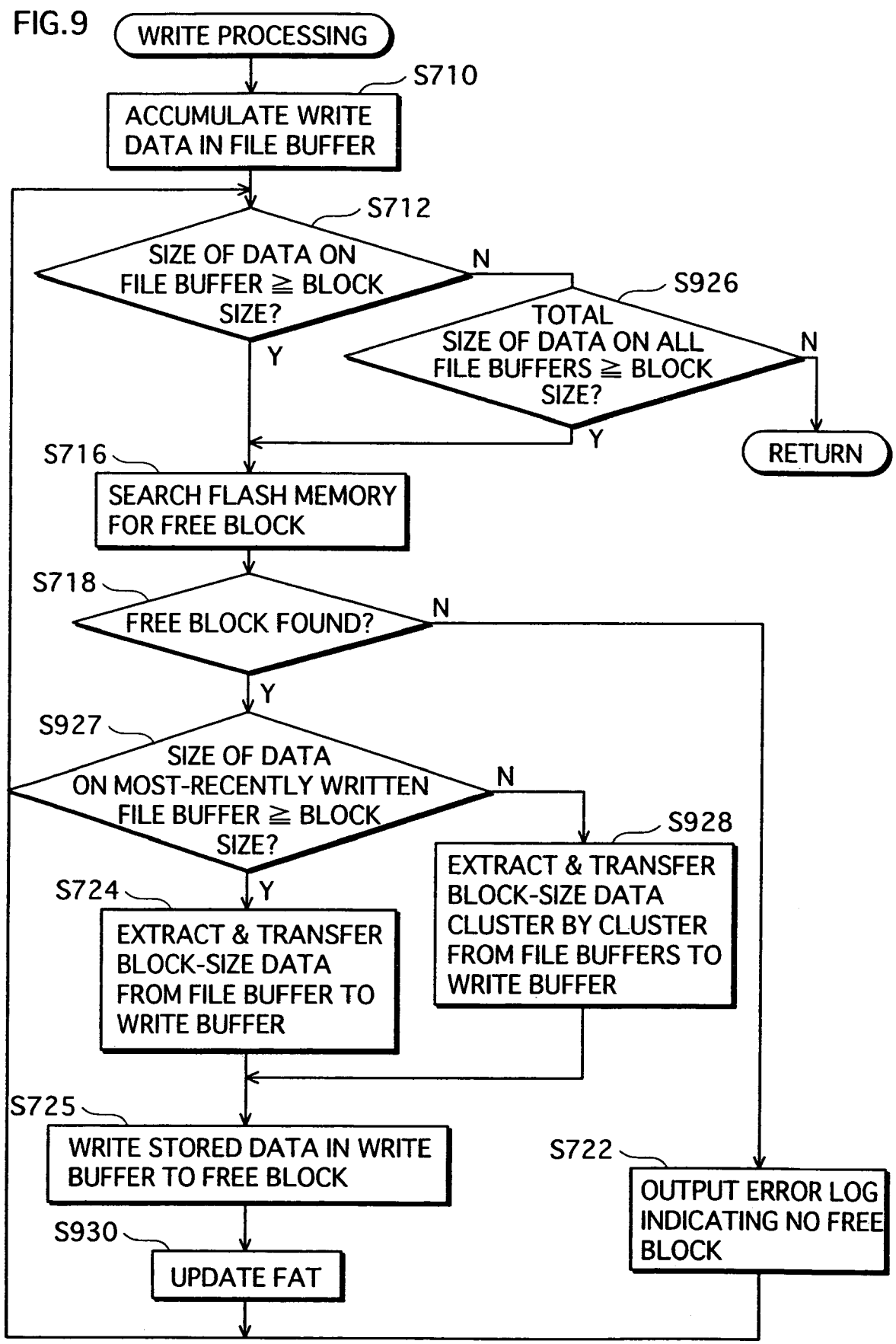
FIG. 9 shows a flowchart of data write processing performed in response to a data write request, according to the second embodiment.

FIG. 9 is a flowchart of detailed processing steps of data write processing performed in response to a data write request, according to the second embodiment.

In FIG. 9, the same step numbers as the ones shown in the flowchart of FIG. 7 are used for the same processing steps.

Now, with reference to FIG. 9, a description is given to the data write processing focusing on different processing steps.

In FIG. 9, when the size of data stored in a specific one of the file buffers into which the data accumulating unit 140 most recently accumulates data is smaller than the block size (S712), the file management unit 190 calculates the total size of data stored in the respective file buffers 120 in units of clusters, and judges whether the calculation result is no smaller than four, which is the number of clusters equivalent to one block (S926). If the judgment results in the affirmative, the file management unit 190 detects a free block for storing the write data (S716)

After allocating a free block, the file management unit 190 judges whether the write data is composed of data of a single file or of multiple files, based on the size of data stored on the specific file buffer into which data is most recently accumulated (S927). If it is judged the write data is composed of data of multiple files, the file management unit 190 extract data from the respective file buffers 120 cluster by cluster until the extracted data reaches the size of one block. The file management unit 190 then transfers the thus extracted data to the write buffer 125 (S928). After the data write to the allocated free block, the FAT is updated by rewriting part relevant to the multiple files to which data is recorded.

Third Embodiment

According to a third embodiment of the present invention, a filter driver operable in the file recording apparatus ensures effective recording of file data.

Figure 10:
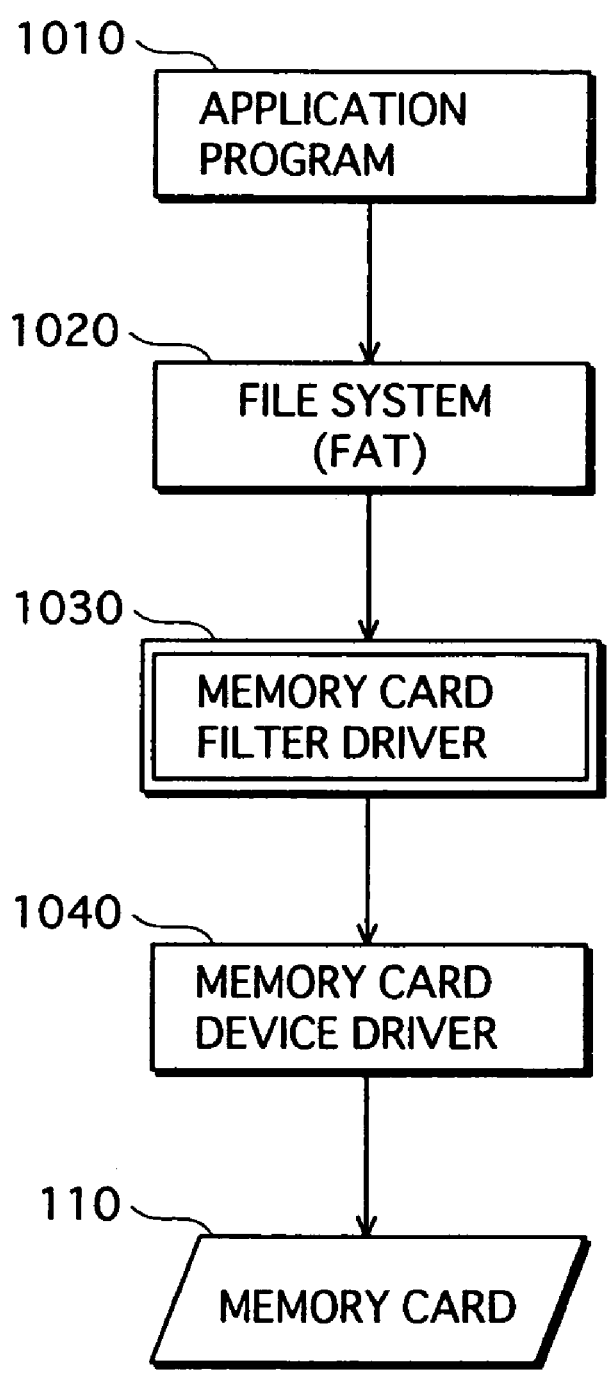
FIG. 10 shows a hierarchical structure of software operating in the file recording apparatus according to a third embodiment of the present invention.

FIG. 10 shows the hierarchical structure of software operating in the file recording apparatus according to the third embodiment.

An application program 1010 is a source issuing a file recording request, within the file recording apparatus. A program for recording video contents is one example of the application program 1010. In order to record a file, the application program 1010 issues an I/O request to a file system 1020.

The file system 1020 is an existing general-purpose file system, such as an FAT file system for Windows operating system (produced by Microsoft Corporation). The file system 1020 records and manages files. More specifically, the file system 1020 carries out, in addition to file management as in the conventional art, processing such as recording of a new file in response to a file I/O request issued form the application program 1010. The file system 1020 itself performs cluster-wise memory allocation and management, just as in the conventional art. That is, the file system 1020 does not perform any block-wise processing or management.

The file system 1020 performs processing according to a file I/O request received from the application program 1010.

The file I/O request may be a file open request, a file close request, a data write request to a file, or a data read request from a file.

On receiving a file I/O request, the file system 1020 issues an I/O request at a device level to a memory card device driver 1040 (hereinafter, simply "device driver 1040") which is a device driver of the memory card 110 (FIG. 1). A device level I/O request is issued in the following way. In the case of a data write request to a file, the file system 1020 searches for free clusters with reference to the FAT and allocates the thus detected free clusters as necessary. The file system 1020 generates a data write request composed of a write address and a data size. Here, the write address is specified by the sector number of the first one of the allocated clusters, and the data size is specified by the number of sectors rather than the number of bytes. The file system 1020 then issues the data write request to the device driver 1040. As described above, an I/O request at a device level specifies the address in the flash memory 205 by a sector number.

A memory card filter driver 1030 (hereinafter, simply "filter driver 1030") intercepts a device-level I/O request issued from the file system 1020 to the device driver 1040. If the I/O request is a write request, the filter driver 1030 keeps the device driver 1040 from immediately performing a data write. Instead, the filter driver 1030 causes the write data to be accumulated in a driver data buffer which is an internal memory area. When a predetermined condition is met, the filter driver 1030 instructs the device driver 1040 to write the accumulated data to the memory card 110 all at once. Note the details of the filter driver 1030 will be given later.

The device driver 1040 receives a device-level I/O request from the filter driver 1030, and performs I/O processing on the memory card 110 as requested.

The memory card 110 is basically identical to that described in the first embodiment. Yet, the format of the flash memory is different in that the reserved area 322 shown in FIG. 3 stores no information regarding blocks. More specifically, information indicating the number of clusters per block (Block/Cluster: 4) is not recorded according to the present embodiment.

Figure 11:
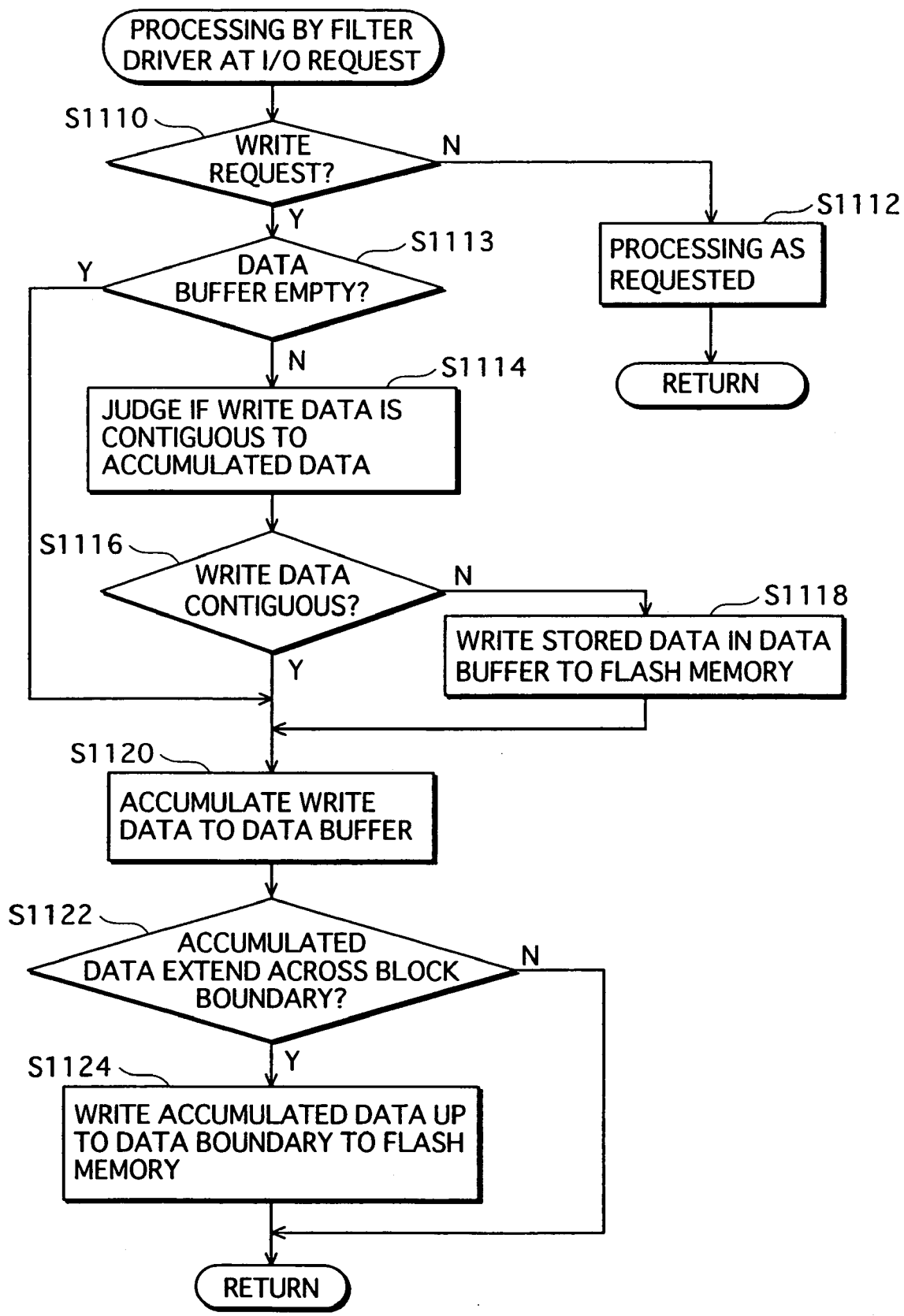
FIG. 11 shows a flowchart of processing steps performed by a filter driver according to the third embodiment.

FIG. 11 is a flowchart of processing steps performed by the filter driver 1030. Now, with reference to FIG. 11, a description is given to the I/O processing performed by the filter driver 1030.

Upon being loaded, the filter driver 1030 reserves a driver data buffer of a predetermined size, e.g. two blocks. The driver data buffer is a memory area used internally. In addition, the filter driver 1030 stores internal information about the number of clusters per block ("Block/Cluster: 4", for example) as well as about the relation among blocks, clusters, and sectors.

When the file system 1020 issues an I/O request at a driver level to the device driver 1040, the filter driver 1030 intercepts the I/O request and judges if it is a write request to the flash memory 205 (S1110). If the I/O request is not a write request, the filter driver 1030 instructs the device driver 1040 to perform requested processing (S1112). The driver-level I/O request refers to an I/O request which specifies read data or write data based on sectors. In the case of a write request, for example, the write start address in the flash memory 205 is specified by a sector number and the size of write data is specified by the numbers of sectors. Note that maximum size of write data specified by the numbers of sectors is limited to the size of one block.

Examples of driver level I/O requests include a write request, a read request, and a block erasing request.

FIG. 12 is a view showing the correspondence between data on the driver data buffer 1201 that is managed by the filter driver 1030 and blocks of the flash memory 205 of the memory card 110. In the example shown in FIG. 12, the driver data buffer 1201 stores data items A1, A2, and A3 having contiguous addresses. The total size of the data items A1, A2, and A3 is equivalent to the block size.

According to the first embodiment, a data write is performed after data equivalent to the block size is stored in a single file buffer. On the contrary, according to the third embodiment, it is not always the case where data is written only after the accumulated data reaches the block size. Yet, it is always the case where one write operation is performed only on a single block either entirely or partly, and never on two or more blocks at a time. In addition, the data write to the block is not performed at each write request. Instead, if write data has contiguous addresses, the write data is accumulated in driver data buffer 1201. Consequently, it is avoided that the same data is written more than one time.

When an I/O request is a write request, the filter driver 1030 judges whether the driver data buffer 1201 is empty (S1113). If it is judged empty, the processing branches to a step S1120. If the data driver buffer 1201 is judged as not empty, the filter driver 1030 judges if the write data is contiguous to the data accumulated in the driver data buffer 1201 (S1114).

In the example shown in FIG. 12, the data item A1 is accumulated in the data driver buffer 1201 and a data item A2 is the write data requested by a write request to be written. The write address (address of the first sector) of the data item A1 is indicated as the sector number s1 and the data size is indicated as the number of sectors d1. The write address of the data item A2 is indicated as the sector number s2 and the data size is indicated as the number of sectors d2. In this case, the data item A1 and the data item A2 are judged to be contiguous if the address s2 is equal to (s1+d1).

If the write data and the data accumulated in the data driver buffer 1201 are not contiguous (S1116:N), the filter driver 1030 causes the device driver 1040 to write the accumulated data to the flash memory 205 (S1118).

Next, the filter driver 1030 accumulates the write data to the driver data buffer 1201 in the following manner (S1120).

If the driver data buffer 1201 is empty from the outset or it is empty because non-contiguous data accumulated therein has just been written, the filter driver 1030 simply stores the write data to the driver data buffer 1201.

If the write data is contiguous to the accumulated data, the filter driver 1030 accumulates the write data to the driver data buffer 1201, so that the drive data buffer 1201 comes to store the write data additionally to the previously accumulated data. The size of write data is updated accordingly.

In the specific example mentioned above, the size of write data before the current data write request is indicated as the number of sectors d1. This data size is changed to (s1+s2) that is calculated by adding d2, which is the size of the write data requested by the current write request. The write address (sector-number) and the data size (the number of sectors) of data accumulated in the driver data buffer 1201 is stored as management information (not illustrated) relating to the driver data buffer 1021.

In the example shown in FIG. 12, the start address (sector number) of the data accumulated in the driver data buffer 1201 falls in the middle of the block 1 and that the accumulated data is equivalent to the size of one block. In this case, the data items A2 and A3 would straddle a block boundary even if the write addresses are contiguous. That is, although the write data is contiguous data having the block size, a data write to the flash memory 205 requires RMW operations to be performed on two blocks. Furthermore, regardless of whether data subsequent to the data item A3 is contiguous for another block, it is again required to perform RMW operations on two block, which is wasteful.

In order to avoid such a waste, the filter driver 1030 judges whether the data accumulated in the driver data buffer 1201 would straddle a block boundary (S1122). The judgment that the accumulated data would straddle a block boundary is made if any of the write sectors targeted for the data write corresponds to the end of a block i.e., the last sector of a block. If it is judged that the accumulated data would straddle a block boundary, only a part of the accumulated data is written to a block of the flash memory 205 (block 1, in the example shown in FIG. 12). The part of the accumulated data to be written extends from the top of the data buffer 1201 to the data of which write address corresponds to the end of the block (data items A1 and A2, in the example shown in FIG. 12). The filter driver 1030 performs the data write to the block of the flash memory 205 (block 1, in the example shown in FIG. 12) by instructing the device driver 1040 to (i) read the data stored in the block onto the memory; (ii) erase the block; (iii) add, on the memory, the part of the accumulated data (the data items A1+A2 in the example shown in FIG. 12) to the data read from the block; and (iv) write back all the data on the memory to the block of the flash memory 205.

According to the third embodiment, the filter driver 1030 performs a data write on a block-by-block basis, but the present embodiment is not limited to such. For example, the functions of the filter driver described above may be incorporated in the device driver or file system.

Up to this point, the present invention has been described by way of the above embodiments. It is naturally appreciated, however, that the present invention is in no way limited to those specific embodiments, and various modifications including the following may be made.

The present invention may be embodied as a computer program causing a computer system to perform any of the methods described above. Furthermore, the present invention may be embodied as digital signals representing any of the programs mentioned above.

Furthermore, the present invention may be embodied as a computer-readable recording medium, such as semiconductor memory, storing any of the programs and digital signals mentioned above.

Furthermore, the present invention may be embodied as any of the computer programs and digital signals mentioned above that is transmitted over an electric communications network, a wireless or wired network, or a network typified by the Internet.

INDUSTRIAL APPLICABILITY

A file recording apparatus according to the present invention is capable of effectively storing large amounts of video and audio data, and thus highly usable in industries, such as music and information industries, involving recording and distribution of a large amount of such data.

The invention claimed is:

1. A file recording apparatus for recording data onto a recording medium which is written in clusters and erased in blocks each composed of a predetermined number of contiguous clusters, the file recording apparatus comprising:

a receiving unit configured to receive a request for writing data of a specific one of a plurality of files onto the recording medium;

a plurality of file buffers each for a different one of the files, and each of said plurality of file buffers being larger than one block size;

a data accumulating unit configured to accumulate the data requested to be written, in one of the file buffers corresponding to the specific file;

a judging unit configured to judge whether data having been accumulated by the data accumulating unit is no smaller than a block size; and a writing unit configured, if the judging unit judges affirmatively, to extract a block of data from the accumulated data and to write the extracted data into a free block of the recording medium, wherein the judging unit judges that the accumulated data is no smaller than the block size, when a total of quotients each calculated by dividing a size of data accumulated in respective one of the file buffers by a cluster size is no smaller than the predetermined number, and the writing unit extracts data from the respective file buffers cluster by cluster until the predetermined number of clusters is reached, and writes the extracted data to the free block of the recording medium.

2. The file recording apparatus according to claim 1, wherein the judging unit judges affirmatively if data having been accumulated in a specific one of the plurality of file buffers to which the data accumulating unit most recently accumulated data is no smaller than the block size, and the writing unit extracts a block of data from a top of the specific one of the plurality of file buffers, and writes the extracted data to the free block of the recording medium.

3. The file recording apparatus according to claim 1, wherein the judging unit judges affirmatively when a total of quotients each calculated by dividing a size of data accumulated in a respective one of the plurality of file buffers by a cluster size is no smaller than the predetermined number, and the writing unit extracts data from the respective one of the plurality of file buffers cluster by cluster until the predetermined number of clusters is reached, and writes the extracted data to the free block of the recording medium.

4. The file recording apparatus according to claim 1, further comprising:

an erasing unit configured to erase the free block before the writing unit writes the extracted data to the free block.

5. A control method for a file recording apparatus that includes a plurality of file buffers each for a different one of a plurality of files and that records data onto a recording medium, the recording medium being written in clusters and erased in blocks each composed of a predetermined number of contiguous clusters, the method comprising:

a receiving step of receiving a request for writing data of a specific one of a plurality of files onto the recording medium;

a data accumulating step of accumulating the data requested to be written, in one of the file buffers corresponding to the specific file, each of said plurality of file buffers being larger than one block size;

a judging step of judging whether data having been accumulated in the data accumulating step is no smaller than a block size; and a writing step of writing, if the judging step results in the affirmative, to extract a block of data from the accumulated data and to write the extracted data into a free block of the recording medium, wherein the judging step judges that the accumulated data is no smaller than the block size, when a total of quotients each calculated by dividing a size of data accumulated in respective one of the file buffers by a cluster size is no smaller than the predetermined number, and the writing unit extracts data from the respective file buffers cluster by cluster until the predetermined number of clusters is reached, and writes the extracted data to the free block of the recording medium.

6. A program recorded on a computer-readable storage medium for execution by a file recording apparatus that includes a plurality of file buffers each for a different one of a plurality of files and that records data onto a recording medium, the recording medium being written in clusters and erased in blocks each composed of a predetermined number of contiguous clusters, the program comprising code configured to cause the file recording apparatus to perform:

a receiving step of receiving a request for writing data of a specific one of a plurality of files onto the recording medium;

a data accumulating step of accumulating the data requested to be written, in one of the file buffers corresponding to the specific file, each of said plurality of file buffers being larger than one block size;

a judging step of judging whether data having been accumulated in the data accumulating step is no smaller than a block size; and a writing step of writing, if the judging step results in the affirmative, to extract a block of data from the accumulated data and to write the extracted data into a free block of the recording medium, wherein the judging step judges that the accumulated data is no smaller than the block size, when a total of quotients each calculated by dividing a size of data accumulated in respective one of the file buffers by a cluster size is no smaller than the predetermined number, and the writing unit extracts data from the respective file buffers cluster by cluster until the predetermined number of clusters is reached, and writes the extracted data to the free block of the recording medium.

7. A program recorded on a computer-readable storage medium for execution by a file recording apparatus that includes a driver data buffer and that records data onto a recording medium, the recording medium being written in clusters and erased in blocks each composed of a predetermined number of contiguous clusters, the program comprising code configured to cause the file recording apparatus to perform:

a receiving step of receiving a write request that specifies a write address on the recording medium at which data is requested to be written;

a first judging step of judging, if the driver data buffer is not empty, whether the write address specified for the data requested to be written is contiguous to a write address specified for data stored on the driver data buffer;

a data accumulating step of accumulating, if the first judging step results in the affirmative, in the driver data buffer the data requested to be written, the driver data buffer being larger than one block size;

a second judging step of judging whether a write address specified for data accumulated in the driver data buffer falls on a block boundary of the recording medium; and a write step of writing, if the second judging step results in the affirmative, a part of the accumulated data from a top of the driver data buffer up to a point corresponding to the block boundary, onto the recording medium, wherein the second judging step judges that the accumulated data is no smaller than the block size, when a total of quotients each calculated by dividing a size of data accumulated in the driver data buffer by a cluster size is no smaller than the predetermined number, and the writing step extracts data from the driver data buffer cluster by cluster until the predetermined number of clusters is reached, and writes the extracted data to the free block of the recording medium.

8. The program according to claim 7, wherein the program comprises a filter driver of the recording medium.

9. A file recording apparatus for recording data onto a recording medium which is written in clusters and erased in blocks each composed of a predetermined number of contiguous clusters, the file recording apparatus comprising:
- a receiving unit configured to receive a request for writing data of a specific one of a plurality of files onto the recording medium;
- a plurality of file buffers each for a different one of the plurality of files, and each of said plurality of file buffers being larger than one block size;
- a data accumulating unit configured to accumulate the data requested to be written, in one of the file buffers corresponding to the specific file;
- a judging unit configured to judge whether a total size of data of the plurality of files having been accumulated in the plurality of file buffers by the data accumulating unit is no smaller than a block size; and
- a writing unit configured, if the judging unit judges affirmatively, to extract a block of data from the accumulated data of the plurality of files and to write the extracted data into a free block of the recording medium, wherein
- the judging unit judges that the accumulated data is no smaller than the block size, when a total of quotients each calculated by dividing a size of data accumulated in respective one of the file buffers by a cluster size is no smaller than the predetermined number, and
- the writing unit extracts data from the respective file buffers cluster by cluster until the predetermined number of clusters is reached, and writes the extracted data to the free block of the recording medium.

10. The file recording apparatus according to claim 9, wherein
- the judging unit judges that the total size of data accumulated in the plurality of file buffers is no smaller than the block size, when a total of quotients each calculated by dividing a size of data accumulated in a respective one of the plurality of file buffers by a cluster size is no smaller than the predetermined number, and
- the writing unit extracts data from the respective one of plurality of file buffers cluster by cluster until the predetermined number of clusters is reached, and writes the extracted data to the free block of the recording medium.

11. The file recording apparatus according to claim 9, further comprising:
- an erasing unit configured to erase the free block before the writing unit writes the extracted data to the free block.

12. A control method for a file recording apparatus that includes a plurality of file buffers each for a different one of a plurality of files and that records data onto a recording medium, the recording medium being written in clusters and erased in blocks each composed of a predetermined number of contiguous clusters, the method comprising:
- a receiving step of receiving a request for writing data of a specific one of a plurality of files onto the recording medium;
- a data accumulating step of accumulating the data requested to be written, in one of the file buffers corresponding to the specific file, each of said plurality of file buffers being larger than one block size;
- a judging step of judging whether a total size of data of the plurality of files having been accumulated in the plurality of file buffers in the data accumulating step is no smaller than a block size; and
- a writing step of writing, if the judging step results in the affirmative, to extract a block of data from the accumulated data of the plurality of files and to write the extracted data into a free block of the recording medium, wherein
- the judging step judges that the accumulated data is no smaller than the block size, when a total of quotients each calculated by dividing a size of data accumulated in respective one of the file buffers by a cluster size is no smaller than the predetermined number, and
- the writing step extracts data from the respective file buffers cluster by cluster until the predetermined number of clusters is reached, and writes the extracted data to the free block of the recording medium.

13. A program recorded on a computer-readable storage medium for execution by a file recording apparatus that includes a plurality of file buffers each for a different one of a plurality of files and that records data onto a recording medium, the recording medium being written in clusters and erased in blocks each composed of a predetermined number of contiguous clusters, the program comprising code configured to cause the file recording apparatus to perform:
- a receiving step of receiving a request for writing data of a specific one of a plurality of files onto the recording medium;
- a data accumulating step of accumulating the data requested to be written, in one of the file buffers corresponding to the specific file, each of said plurality of file buffers being larger than one block size;
- a judging step of judging whether a total size of data of the plurality of files having been accumulated in the plurality of file buffers in the data accumulating step is no smaller than a block size; and
- a writing step of writing, if the judging step results in the affirmative, to extract a block of data from the accumulated data of the plurality of files and to write the extracted data into a free block of the recording medium, wherein
- the judging step judges that the accumulated data is no smaller than the block size, when a total of quotients each calculated by dividing a size of data accumulated in respective one of the file buffers by a cluster size is no smaller than the predetermined number, and
- the writing step extracts data from the respective file buffers cluster by cluster until the predetermined number of clusters is reached, and writes the extracted data to the free block of the recording medium.

* * * * *